United States Patent
Kathuria

(10) Patent No.: US 10,432,703 B2
(45) Date of Patent: Oct. 1, 2019

(54) ON-DEMAND SESSION UPGRADE IN A COORDINATION SERVICE

(71) Applicant: Facebook, Inc., Menlo Park, CA (US)

(72) Inventor: Vishal Kathuria, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 900 days.

(21) Appl. No.: 13/685,461

(22) Filed: Nov. 26, 2012

(65) Prior Publication Data

US 2014/0149489 A1 May 29, 2014

(51) Int. Cl.
*H04L 29/06* (2006.01)
*H04L 29/08* (2006.01)
*G06F 8/70* (2018.01)

(52) U.S. Cl.
CPC ................ *H04L 67/1002* (2013.01)

(58) Field of Classification Search
CPC ... H04L 69/329; H04L 67/10; H04L 12/1827; H04L 65/605; H04L 12/1813; H04L 12/1822; H04L 12/1831; H04L 12/1836; H04L 65/403; H04L 67/32; H04L 63/08; H04L 41/0803; H04L 67/12; H04L 12/5835; H04L 41/5054; H04L 41/5058; H04L 43/0817; H04L 45/28; H04L 45/38; H04L 45/48; H04L 45/54; H04L 49/205; H04L 49/254; H04L 49/35; H04L 61/106; H04L 61/1511; H04L 61/1541; H04L 61/6018; H04L 67/16; H04L 67/42; H04L 29/06; H04L 29/12113; H04L 67/40; H04L 12/2874; H04L 41/046; H04L 67/125; H04L 67/2819; H04L 67/14;
(Continued)

(56) References Cited

U.S. PATENT DOCUMENTS 6,157,927 A * 12/2000 Schaefer ................. G06F 9/466
7,433,928 B1 * 10/2008 Ranade ................. H04L 67/104
709/216
(Continued)

OTHER PUBLICATIONS

Hunt et al.—ZooKeeper: wait free coordination for internet-scale system—UNSENIXACT10 Proceeding of the 2010 USENIX conference on UNESIX annual technical conference—2010—pp. 1-14.*
(Continued)

*Primary Examiner* — Backhean Tiv
*Assistant Examiner* — Linh T. Nguyen
(74) *Attorney, Agent, or Firm* — FisherBroyles, LLP

(57) ABSTRACT

Disclosed is a method and system for upgrading a local session between a server and a client in a Coordination Service to a global session on-demand. Exemplary embodiments may include (i) determining whether a type of transaction received at a server in a group of servers from a client is a first transaction type or a second transaction type, (ii) responsive to a determination that the transaction is first transaction type, creating a local session between the server and the client for executing the transaction, wherein the transactions of first transaction type do not require a vote from each of the servers in the group for executing; and (iii) responsive to a determination that the transaction is the second transaction type, converting the existing local session to a global session, wherein the transactions of second transaction type require a vote from each of the servers in the group for executing.

16 Claims, 6 Drawing Sheets

(58) Field of Classification Search
CPC . H04L 65/1083; H04L 67/141; H04L 67/148; H04L 67/02; H04L 29/08594; H04L 65/1066; H04L 65/1086; H04L 67/1097; H04L 69/40; G06F 13/124; G06F 13/385; G06F 13/4059; G06F 13/42; G06F 13/4252; G06F 13/4265; G06F 13/4269; G06F 13/4282; G06F 13/4022; G06F 13/4027; G06F 2212/2542; G06F 13/105; G06F 17/30575; G06F 13/4068; G06F 13/4273; G06F 17/30362; G06F 2213/0026; G06F 9/3004; G06F 9/30072; G06F 9/30087; G06F 9/467; G06F 11/0745; G06F 11/0757; G06F 13/24; G06F 13/4295; G06F 17/30359; G06F 11/3644; G06F 11/3656; G06F 8/70; G06F 9/466; G06F 11/1474; G06F 11/2028; G06F 17/30371; G06F 11/2041; G06F 11/2046; G06F 11/2097; G06F 11/2023; G06F 17/30377; G06F 17/30578; G06F 2201/82; G06F 17/30348; G06F 2209/541; G06F 15/17318; G06F 9/54; G06F 9/04; G06F 9/5088; H04W 36/0011; H04W 40/248
USPC ....... 709/203, 227, 201, 202, 204, 217, 219, 709/223, 218, 207, 208, 228; 707/E17.007, 999.202, 618, 610; 714/20, 714/4.11; 370/259, 260
See application file for complete search history.

(56) References Cited

U.S. PATENT DOCUMENTS

| | | | | |
|---|---|---|---|---|
| 7,478,400 | B1* | 1/2009 | Banerjee | G06F 17/30067 719/313 |
| 7,702,947 | B2* | 4/2010 | Peddada | 714/4.1 |
| 8,051,183 | B1* | 11/2011 | Mueller | H04L 67/1097 709/203 |
| 8,219,684 | B1* | 7/2012 | Dean | 709/226 |
| 8,510,451 | B2* | 8/2013 | Wada | 709/227 |
| 8,966,027 | B1* | 2/2015 | Brandwine et al. | 709/221 |
| 9,172,670 | B1* | 10/2015 | Gupta | H04L 51/30 |
| 2003/0046342 | A1* | 3/2003 | Felt et al. | 709/203 |
| 2004/0153383 | A1* | 8/2004 | K et al. | 705/35 |
| 2005/0066095 | A1* | 3/2005 | Mullick et al. | 710/200 |
| 2005/0102429 | A1* | 5/2005 | Pinhas et al. | 709/248 |
| 2005/0198117 | A1* | 9/2005 | Dias et al. | 709/203 |
| 2005/0267920 | A1* | 12/2005 | Helliker | G06F 17/30073 |
| 2007/0011226 | A1* | 1/2007 | Hinni | H04L 67/16 709/203 |
| 2007/0011302 | A1* | 1/2007 | Groner | G06F 11/1076 709/224 |
| 2007/0192326 | A1* | 8/2007 | Angal | G06F 11/1482 |
| 2007/0286141 | A1* | 12/2007 | Horn et al. | 370/338 |
| 2008/0028436 | A1* | 1/2008 | Hannel | H04L 63/0218 726/1 |
| 2009/0157766 | A1* | 6/2009 | Shen | G06F 11/2097 |
| 2010/0082728 | A1* | 4/2010 | Cooper | G06F 15/16 |
| 2010/0235901 | A1* | 9/2010 | Simpkins et al. | 726/12 |
| 2012/0036180 | A1* | 2/2012 | Thornton | H04L 67/1023 709/203 |
| 2013/0111261 | A1* | 5/2013 | Dalton | 714/4.11 |

OTHER PUBLICATIONS

BoxBLOGS—A Gotcha When Using Zookeeper Ephemeral Nodes—Apr. 9, 2012—p. 1-3—https://www.box.com/blog/a-gotcha-when-using-zookeeper-ephemeral-nodes/.*

Apache—ZooKeeper Programmer's Guide—Dec. 15, 2010—pp. 1-17.*

Henry Robinson, Observers: Making ZooKeeper Scale Even Further, Dec. 15, 2009, Cloudera Engineering Blog, pp. 1-11.*

Jeya Barani, Zookeeper as Distributed Consensus Service, Nov. 18, 2012, Jeyabarani's blog, pp. 1-10.*

Benjamin Reed; ZooKeeper Overview; Nov. 16, 2012; Apache Software Foundation; p. 1 (Year: 2012).*

Burrows, M., "The Chubby lock service for loosely-coupled distributed systems." Google, Inc., 16 pages.

* cited by examiner

ON-DEMAND SESSION UPGRADE IN A COORDINATION SERVICE

FIELD OF INVENTION

This invention generally relates to a coordination service for distributed systems. More specifically, the invention relates to converting a local session to a global session on-demand in the coordination service for distributed systems.

BACKGROUND

A distributed system environment includes a number of systems such as, for example, servers providing one or more services, and clients seeking one or more services. The various systems may communicate via a computer network. Coordinating the operations or services between various resources in the distributed system and providing the services at an acceptable performance level is a challenge. ZooKeeper™ from Apache Software Foundation of Forest Hill, Md., is one example of a service that provides a coordination service for distributed applications or distributed systems.

In the ZooKeeper service, when a client requests a connection to a server, the server may forward the connection request to a leader in the ZooKeeper service and the leader may obtain a consensus from the ensemble before forwarding the decision to the server from which the client requested the connection. Upon receiving a consensus or votes from the ensemble, the server allows the client to connect to the ZooKeeper service.

Some coordination services follow a lazy consensus approach in which the consensus is typically not obtained immediately after receiving the request. In the lazy approach, a consensus may be obtained a certain time period after the request is issued. Regardless of how the consensus is obtained, the process of obtaining a consensus is typically performed for most of the transactions requested by the client. For many transactions, obtaining a consensus from the ensemble may not be required. The process of obtaining a consensus from the ensemble consumes a significant amount of time and resources of the coordination service.

In view of the foregoing, it would be useful to provide a coordination service that may at least (i) use the resources more efficiently based on a type of the transaction and (ii) enhance the performance of the service, at least in terms of speed and memory.

SUMMARY

What is described is a method and system for upgrading a local session between a server and a client, in a coordination service for distributed systems, to a global session when the client requests to execute a transaction that may not be executed in the local session. Exemplary embodiments of the invention may include (i) receiving, at a server in a group of servers and from a client device, a request for executing a transaction in the group; (ii) determining a type of the transaction as a first transaction type or a second transaction type; (iii) responsive to a determination that the transaction is first transaction type, creating or using an existing local session between the server and the client device for executing the transaction, wherein the transaction of first transaction type does not require a vote from each of the servers in the group for executing; (iv) responsive to a determination that the transaction is the second transaction type, converting the existing local session to a global session, wherein the transaction of second transaction type requires a vote from each of the servers in the group for executing in the group; and (v) executing the transaction using the selected session.

In at least some exemplary embodiments of the invention, converting the existing local session to a global session may include (i) informing the servers in the group about the existing local session between the client device and the server and (ii) creating an ephemeral node representing the transaction of the second transaction type, wherein the ephemeral node contains data required for the execution of the transaction of the second transaction type.

In at least some exemplary embodiments of the invention, creating the ephemeral node may further include storing the ephemeral node in each server of the group of servers and synchronizing a state of the ephemeral node across each server of the group of servers.

At least some exemplary embodiments of the invention may include (i) receiving, at a server in a group of servers and from a client device, a request for executing a transaction in the group; (ii) determining whether an ephemeral node is required for executing the transaction; (iii) responsive to a determination that the ephemeral node is required for executing the transaction, converting an existing local session between the client device and the server to a global session by (a) informing the servers in the group about the existing local session between the client device and the server, and (b) creating the ephemeral node representing the transaction, wherein the global session facilitates obtaining a vote for creating the ephemeral node from each of the servers in the group of servers; and (iv) executing the transaction using the global session.

Some embodiments of the invention have other aspects, elements, features, and steps in addition to or in place of what is described above. These potential additions and replacements are described throughout the rest of the specification.

BRIEF DESCRIPTION OF THE DRAWINGS

FIG. 2 which includes

DETAILED DESCRIPTION

Disclosed is a method and system for upgrading a local session between a server and a client, in a coordination service for distributed systems, to a global session on-demand. The methods may include (i) determining whether a type of transaction received at a server in a group of servers from a client is a first transaction type or a second transaction type, (ii) if the transaction is of first transaction type, creating a local session between the server and the client for executing the transaction, wherein the transactions of first transaction type do not require a vote from each of the servers in the group for executing; and (iii) if the transaction is of the second transaction type, converting the existing local session to a global session, wherein the transactions of second transaction type require a vote from each of the servers in the group for executing. The global session facilitates obtaining a consensus from the servers in the group.

Example Environment

Figure 1:
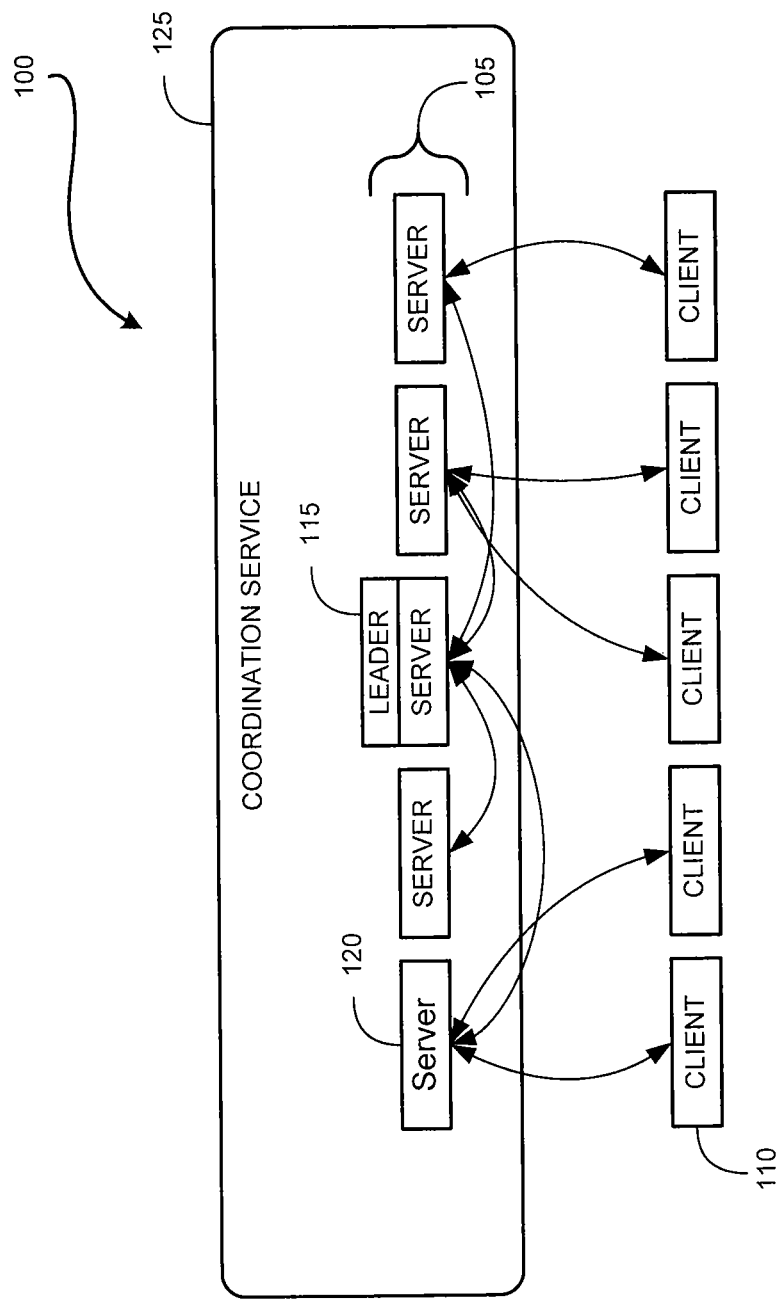
FIG. 1 illustrates an exemplary environment in which an embodiment of the invention may operate.

FIG. 1 illustrates an example environment 100 in which an embodiment of the invention may operate. As shown, the environment 100 may include a coordination service such as, for example, ZooKeeper™ service 125 available from Apache Software Foundation of Forest Hill, Md. In another embodiment, the environment 100 may include other similar services that may provide coordination services for distributed systems or distributed applications. The Coordination service 125 may provide coordination services such as, for example, synchronization, configuration maintenance, groups, and naming for distributed applications. The Coordination service 125 allows distributed processes to coordinate with each other through a shared hierarchal namespace which is organized similarly to a standard file system. The namespace in the Coordination service 125 may store data in one or more nodes. The nodes may store coordination data such as, for example, status information, configuration information, and location information of the applications using the Coordination service 125.

The Coordination service 125 may be replicated over a group of servers 105 called an ensemble. (The group of servers 105 may be referred as "group" or "ensemble" hereafter.) In an embodiment, these servers may maintain an in-memory image of state of the servers, along with transaction logs and snapshots in a persistent store. As long as a majority of the servers in the group 105 are available, the Coordination service 125 may be available. The reliability aspects prevent the Coordination service 125 from becoming the single point of failure in large distributed systems. Each server in the group 105 may know information such as, for example, a state of each other server.

In the ensemble 105, one server may act as a leader 115, whose role is to accept and coordinate transactions such as, for example, writes, via a consensus. All other servers, for example, servers other than leader 115 in the ensemble, may act as followers which may be direct, read-only replicas of the leader 115. In the Coordination service 125, some write requests from clients may be forwarded to the leader 115. The followers may receive proposals from the leader 115 and may agree or disagree upon serving the request from the client. Further, in the Coordination service 125, if the leader 115 becomes unavailable, for example, when the leader 115 fails or crashes, any other follower may be picked up as a new leader, via a consensus, and may continue serving requests. The rest of the followers may be synchronized with the new leader.

In an embodiment, clients may know the list of servers in ensemble 105. The clients may connect to the Coordination service 125 using this list of servers. In an embodiment, a client 110 may connect only to one server, for example, server 120 in the Coordination service 125. The client 110 may maintain a connection with server 120 through which it may send requests, get responses, and send messages, at regular intervals, indicating that it is still connected to the server 120. If the connection to the server 120 breaks, the client 110 may connect to a different server. When the client 110 first connects to the Coordination service 125 via server 120, the server 120 may setup a session for the client 110. If the client 110 connects to another server, for example, when the server 120 fails, the previously established session may be reestablished with the new server.

In an embodiment, some transactions in the Coordination service 125 may require a vote from all the servers in the ensemble 105 to be executed and some transactions may not require a vote from all the servers in the ensemble 105. Transactions such as, for example, a connection request or a read request from a client may not require a vote from the all the servers in the ensemble 105. On the other hand, write requests such as creating an ephemeral node may require a vote from all the servers in the ensemble 105. The transactions that do not require a vote by all the servers may be performed locally to the client and the server the client is connected to. Such transactions may be executed by creating a local session between the client requesting such a transaction and the server to which the client is connected. For example, a connection request by client 110 to server 120 may be performed locally to the client 110 and server 120 by creating a local session between the client 110 and server 120. In an embodiment, a transaction executing using a local session between a client and a server may be visible only to the server to which the client is connected. The remaining of the servers in the ensemble may not be aware of the transactions executing in the local session between the client and the server. For example, the connection request between client 110 and the server 120 which is executed using a local session may be visible only to the server 120 and not to other servers in the Coordination service 125.

An ephemeral node is a special type of node that exists only for a lifetime of a session between the client and the server the client is connected to. Once the session between the client and the server is terminated, either normally or abnormally (for example, via a time out), the ephemeral node may be deleted. After the ephemeral node is created, it is stored on all the servers in the ensemble 105 and a state of the ephemeral node is synchronized across the servers in the ensemble 105. In an exemplary embodiment, ephemeral nodes may be used for service discovery, that is, when services are running they publish metadata about their location (for example, hostname and port). So the clients of the service may not need to know the list of potential service addresses and can instead know what services are available on-demand. And when the service stops, its discovery information may be automatically removed from the Coordination service 125 since the session that created the ephemeral node for the service is deleted, and clients may no longer view the service as available.

In an embodiment, to perform a transaction such as, for example, creating an ephemeral node, a global session is required. The global session is a session in which at least a majority of the servers in the group are aware of the session. The global session is capable of obtaining a vote from the servers in the ensemble 105 for creating the ephemeral node on a particular server, synchronizing a state of the created ephemeral node across the servers and deleting the created ephemeral node across the servers when the session dies. In an embodiment, the existing local session between the client and the server to which the client is initially connected to, may not be capable of performing the above mentioned activities since the other servers in the group are not aware of the local session. Accordingly, the local session may have to be converted or upgraded to a global session that is capable of performing such transactions. In an embodiment, transactions executing in the global session would be visible to all the servers in the ensemble 105.

By creating a local session between a client and a server initially, for example, when the client connects to the server in the Coordination service, and upgrading the existing local session to a global session on demand, that is, when the client requests to perform transactions that may require a global session, the resources of the Coordination service may be used more effectively which typically results in a significant performance improvement, at least in terms of speed and the memory consumed.

Figure 2A:
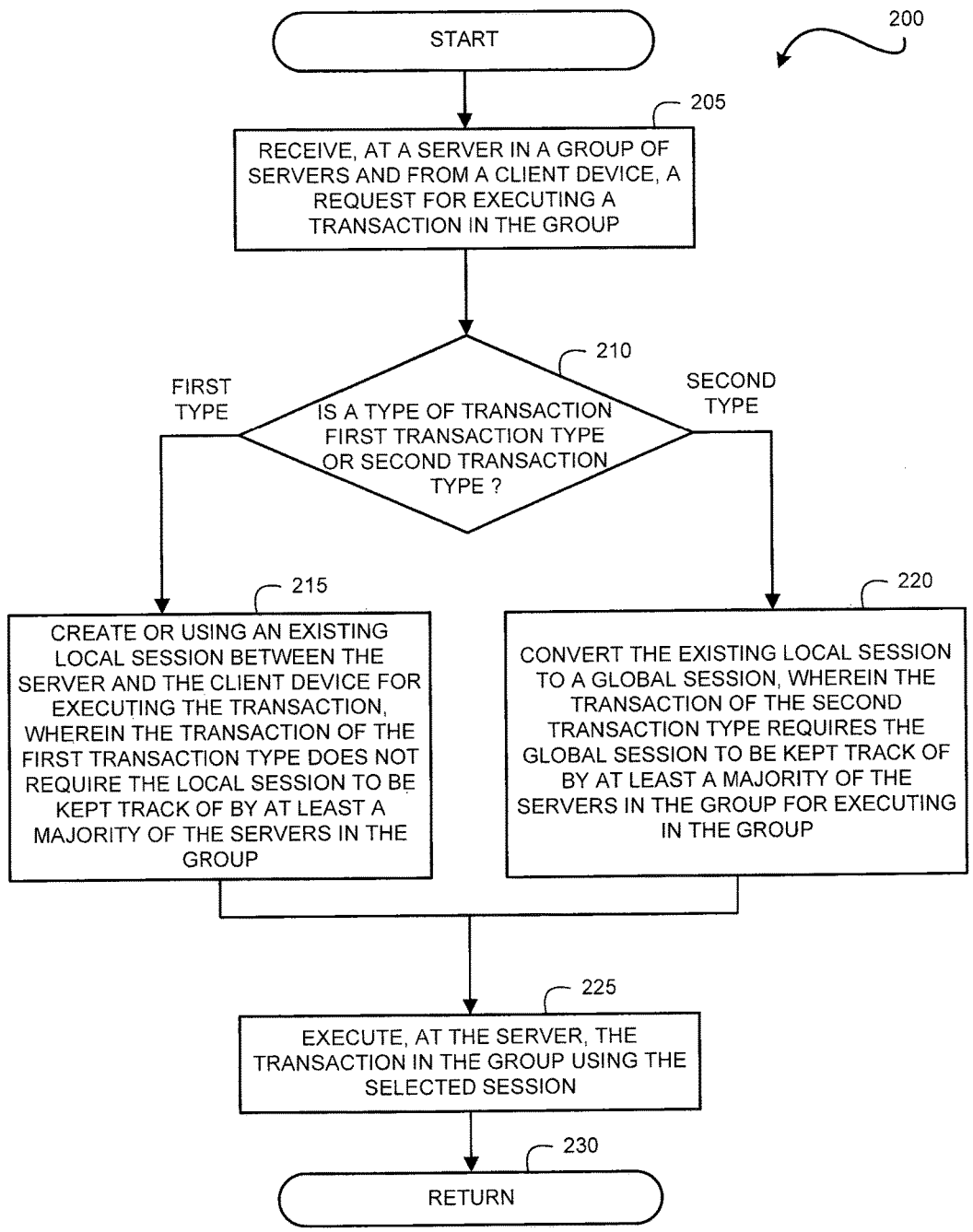
FIGS. 2A and 2B is an exemplary flow diagram for converting a local session to a global session in a coordination service for distributed systems, according to an embodiment of the invention.
Figure 2B:
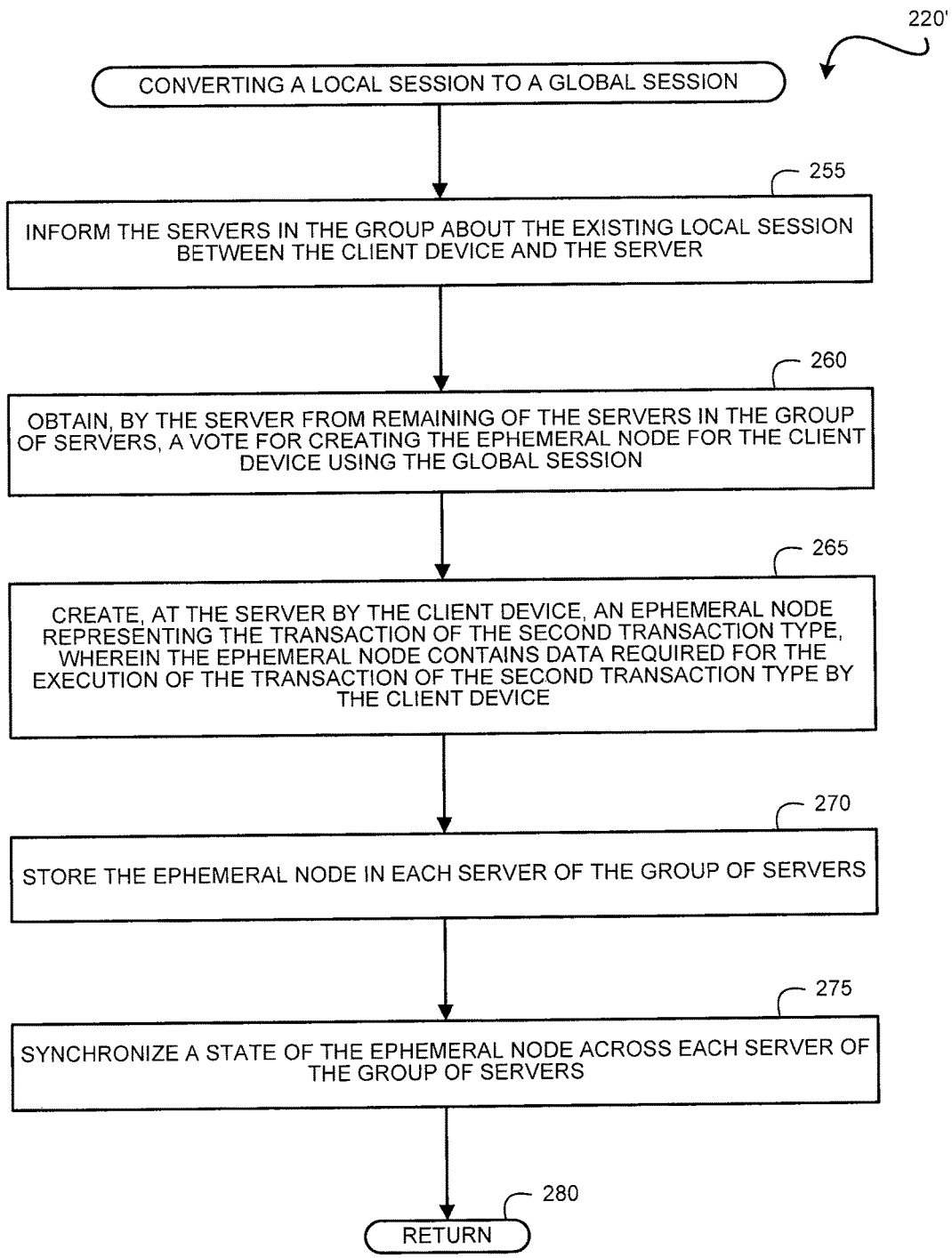

Methods for Upgrading a Local Session to a Global Session in a Coordination Service for Distributed Systems FIG. 2 which includes FIGS. 2A and 2B is an exemplary flow diagram for converting a local session to a global session in a coordination service for distributed systems, according to an embodiment of the invention. The method 200 may be used in a coordination service such as, for example, Coordination service 125 of FIG. 1. In another embodiment, the method 200 may also be used in other similar coordination services. The method 200 may be used to determine a transaction type of a transaction received at a server and execute the transaction using an appropriate session. At step 205, a request for executing a transaction at a server in a group of servers is received from a client device. In an embodiment, the group of servers is an ensemble 105 of a Coordination service 125. At node 210, it is determined whether the received transaction is of a first transaction type or of a second transaction type.

At step 215, responsive to a determination that the transaction is of the first transaction type, a new local session is created or an existing local session between the server and the client device is used for executing the transaction. In an embodiment, the transactions of the first transaction type do not require that the local session be kept track of by at least a majority of the servers in the group. At step 220, responsive to a determination that the transaction is of the second transaction type, the existing local session between the client device and the server is converted to a global session, wherein the transactions of the second transaction type require that the global session be kept track of at least by a majority of the servers in the group for executing in the group. At step 225, the transaction is executed in the group using the selected session. Finally, the method 200 is left at node 230.

Referring back to step 220, in an embodiment consistent with the invention, converting the local session between the client device and the server may include the steps described in method 220'. At step 255, the servers in the ensemble may be informed about the existing local session between the client device and the server. Further, the server to which the client device is connected requests that the local session be converted to a global session. At step 260, the server obtains a vote from the ensemble for the creation of an ephemeral node. After obtaining a consensus from the ensemble, at step 265, the ephemeral node is created at the server by the client device using the global session. The ephemeral node contains data representing a transaction of the second transaction type. For example, an ephemeral node may be created for service discovery processes that may be used to discover a particular service in a distributed application. At step 270, the ephemeral node is stored in all servers of the ensemble. Further, at step 275, a state of the ephemeral node is synchronized across all the servers in the ensemble. Finally, the method 220' is left at node 280.

Referring back to steps 255 and 260, the server obtains a consensus from the ensemble for the respective requests by forwarding the request to a leader of the ensemble which in turn obtains a consensus from the rest of the followers and forwards the response to the requesting server.

Figure 3:
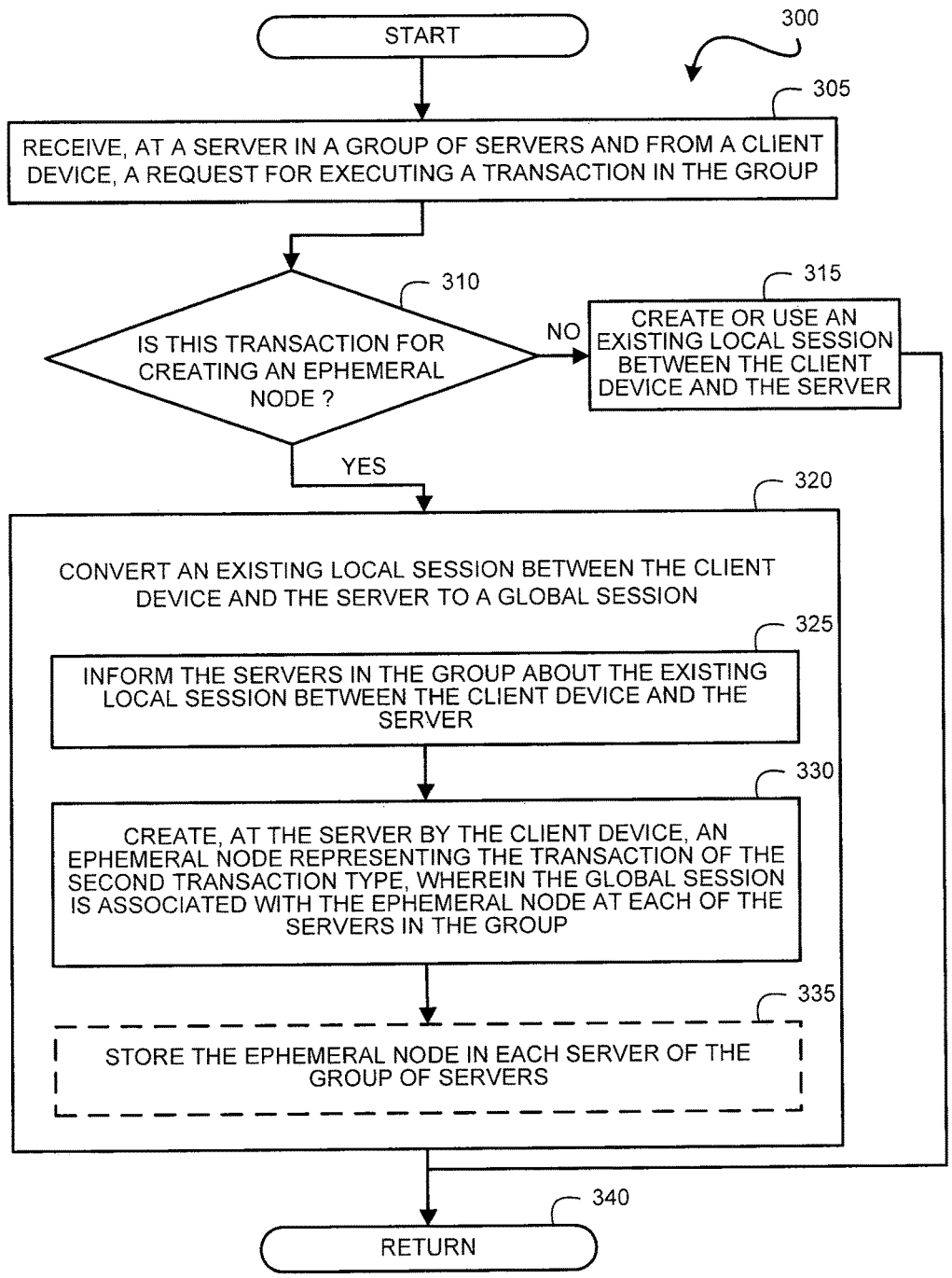
FIG. 3 is a flow diagram for converting a local session to a global session in a coordination service for distributed systems, according to another embodiment of the invention.

FIG. 3 is a flow diagram for converting a local session to a global session in a Coordination Service according to another embodiment of the invention. The method 300 may be used in an environment such as Coordination service 125 of FIG. 1. At step 305, a request for executing a transaction in a group of servers is received at a server in the group from a client device. At node 310, it is determined whether the transaction is for creating an ephemeral node. At step 315, responsive to a determination that the transaction is not for a creation of an ephemeral node, the transaction is executed using a new or an existing local session between the client device and the server, and the method 300 is left at node 340.

On the other hand, responsive to a determination that the transaction is for creating an ephemeral node, at step 320, an existing local session between the client device and the server is converted to a global session. In an embodiment, the local session is converted to a global session by informing the servers in the group about the existing local session between the client device and the server and requesting that the local session be converted to a global session, as depicted at step 325. At step 330, the ephemeral node representing the transaction is created, at the server and by the client device, using the global session which facilitates obtaining a vote for creating the ephemeral node from each of the servers in the group. At step 335, the ephemeral node is stored in each of the servers in the group of servers. The method 300 returns at node 340.

Illustrative Examples of Operation

Figure 4:
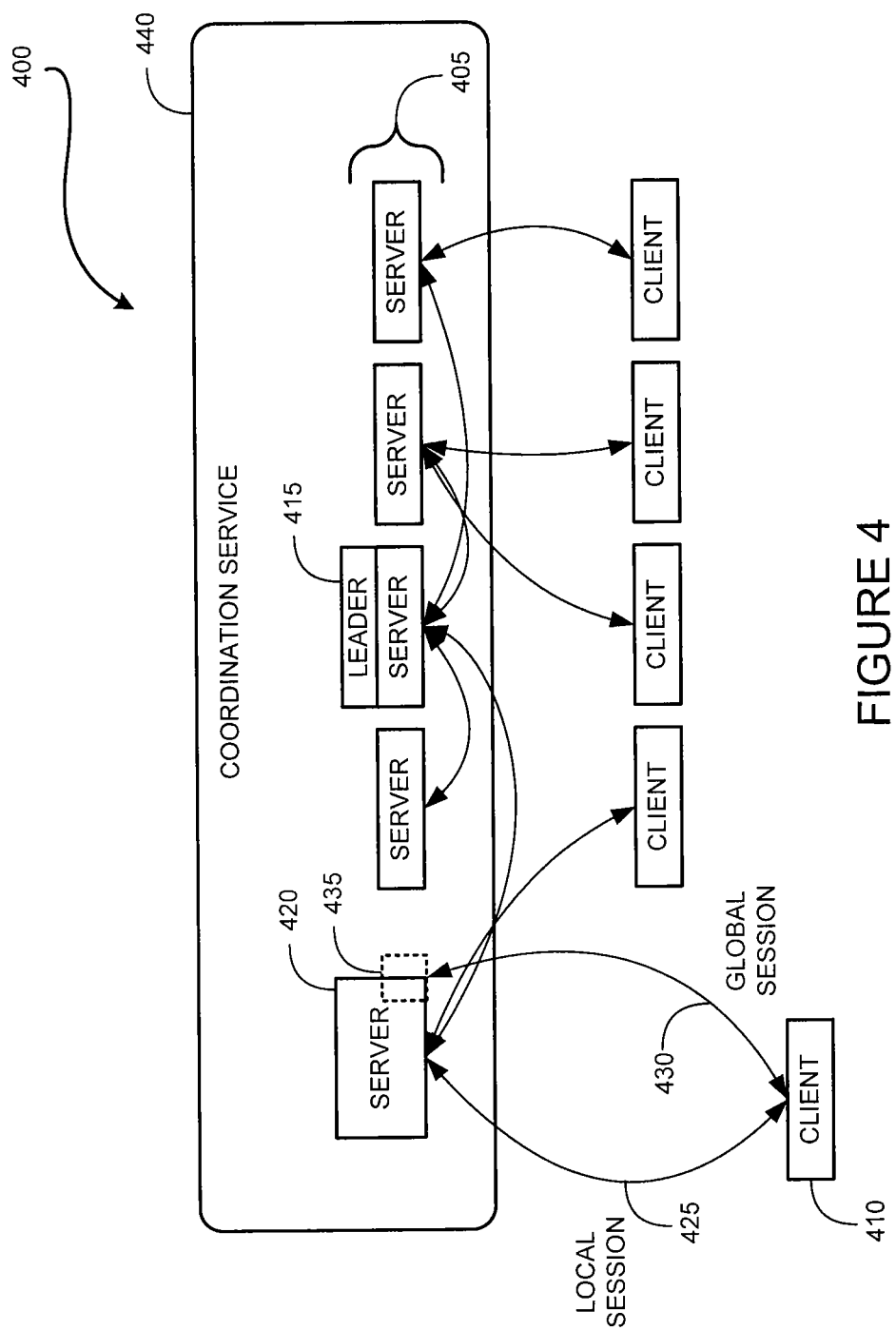
FIG. 4 provides an example illustrating converting a local session to a global session based on a transaction type in a Coordination Service of FIG. 1, according to an embodiment of the invention.

FIG. 4 provides an example system 400 illustrating converting a local session to a global session based on a transaction type in the Coordination service of FIG. 1, according to an embodiment of the invention. FIG. 4 illustrates a Coordination service 440 having a group of servers 405 called an ensemble. The ensemble 405 may include a server that is a leader 415. The rest of the servers may be followers which may be an exact replica of the leader 415. Each of the servers in the ensemble 405 knows a state of each of the other servers in the ensemble 405. The clients, including client 410, may consume the services provided by the Coordination service 440 by connecting to one of the servers in the ensemble 405. In an embodiment, the clients may connect only to one server in the ensemble 405. For example, the client 410 may connect to a server 420 in the Coordination service 440.

In an embodiment, transaction requests from the client 410 may be classified into at least two transaction types, namely, a first transaction type that runs in a local session between the client 410 and the server 420, and a second transaction type which includes transactions that (i) may require a vote from all the servers in ensemble 405 to execute and (ii) a majority of the servers in the group 405 be aware of. The consensus or vote for executing such transactions may be obtained using a global session. Since the transactions that execute in a global session may require a consensus from the ensemble, a significant amount of time and resources are consumed in obtaining the consensus from the ensemble. Hence, it may be important to invoke a global session only for transactions that may need a consensus, and use only local sessions for transactions that may not need a consensus.

Alternatively or additionally, a local session may be used by default for all transactions initially, and the local session may be upgraded or converted to a global session only when the client requests execution of transactions that may require a global session, that is, on-demand from the client 410.

In the Coordination service 440, transactions such as a connection request, a read request, watch request or certain write requests from the client 410 may be executed using a local session between the client 410 and the server 420. For example, a connection request 425 may be executed using a local session between the client 410 and the server 420. The servers other than server 420 may not be aware of the client 410 and the connection request 425. Executing such a transaction in the local session when a global session is not required may improve the efficiency of the coordination service at least in terms of speed, memory and resource utilization.

On the other hand, a transaction such as, for example, creating an ephemeral node 435 which requires a consensus from all the servers in ensemble 405 may be executed using a global session 430. When the client 410 requests creating an ephemeral node 435, the existing local session between the client 410 and the server 420 may be converted to a global session 430. When the session is converted to a global session 430, all the servers in the ensemble 405 may become aware of the client 410 and the connection 425. Then, the ephemeral node creation request may be forwarded by the server 420 to the leader 415 which obtains the consensus from the rest of the servers in the ensemble 405. The leader 415 then forwards the consensus to the server 420 which allows the client 410 to create the ephemeral node 435, at server 420, using the global session 430.

In an embodiment, the ephemeral node 435 is stored on all the servers in the ensemble 405. Further, a state of the ephemeral node 435 is synchronized across all the servers in the ensemble 405. In an embodiment, the ephemeral node 435 may be stored in the ensemble 405 only for the lifetime of the global session 430. If the global session 430 is terminated, either normally or abnormally, the ephemeral node 435 may be deleted from all the servers in the ensemble 405.

In an embodiment, the global session 430 creates a lock on the ephemeral node 435 which may make the ephemeral node 435 accessible only to the global session 430 and the client 410 that created the ephemeral node 435. Further, the Coordination service 440 may reset the lock on the ephemeral node 435 if the global session 430 or the client 410 that created the ephemeral node 435 fails before releasing the lock on the ephemeral node 435.

Example Apparatus

Figure 5:
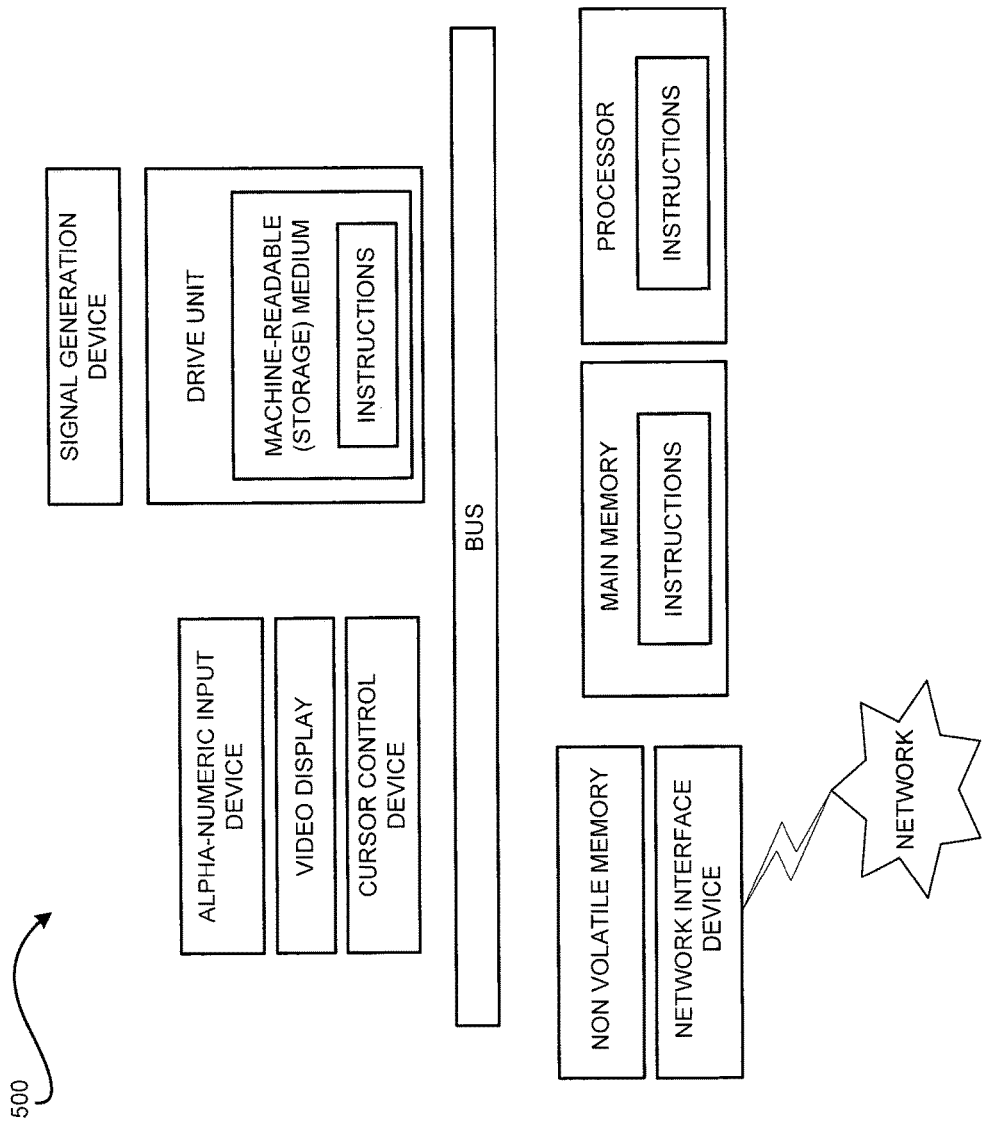
FIG. 5 is a block diagram of an exemplary apparatus that may perform various operations, and store various information generated and/or used by such operations, according to an embodiment of the invention.

FIG. 5 is a block diagram of an exemplary apparatus that may perform various operations, and store various information generated and/or used by such operations, according to an embodiment of the invention.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components or services depicted in the example of FIGS. 1-4 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

CLARIFICATION

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at a server in a group of servers and from a client device, a request for executing a transaction by the server;
determining, at the server, a type of the transaction as a first transaction type or a second transaction type;
responsive to a determination that the transaction is of the first transaction type, creating or using, by the server, an existing local session between the server and the client device for executing the transaction, wherein the transaction of the first transaction type does not require the local session to be kept track of by at least a majority of the servers in the group;
responsive to a determination that the transaction is of the second transaction type, converting, by the server, the existing local session to a global session between the client device and the server, wherein:
the existing local session is associated with a prior transaction that is of the first transaction type and is separate from the transaction, and
the transaction of the second transaction type requires the global session to be kept track of by at least a majority of the servers in the group for executing in the group, wherein converting the existing local session includes:
informing the servers in the group about the existing local session,
requesting, by the server, a leader server in the group to obtain a vote of the majority of the servers in the group to create an ephemeral node at the server using the global session, the ephemeral node representing the transaction of the second transaction type,
forwarding, by the leader server to the server, the vote to create the ephemeral node, and
creating, at the server and by the client device in response to receiving the vote, the ephemeral node, wherein the ephemeral node contains data required for the execution of the transaction of the second transaction type, and wherein the ephemeral node is stored in each server of the group of servers for a lifetime of the global session between the server and the client device; and
executing, at the server, the transaction in the group, wherein the executing includes: using the ephemeral node for discovering, based on metadata published by multiple services, a location of one or more of the multiple services executing in a distributed computing system.

2. The method of claim 1, wherein the act of creating the ephemeral node further comprises:
synchronizing a state of the ephemeral node across each server of the group of servers.

3. The method of claim 1, wherein the ephemeral node is deleted from each server of the group of servers when the global session between the client device which created the ephemeral node and the server terminates either normally or abnormally.

4. The method of claim 1, wherein the act of creating the ephemeral node further comprises:
creating, by the client device, a lock on the ephemeral node which restricts access to the ephemeral node to the client device that created the ephemeral node.

5. The method of claim 4, wherein the lock on the ephemeral node is reset, by the server, when the client device fails before releasing the lock on the ephemeral node.

6. The method of claim 1, wherein the first transaction type includes transactions that are executable in the local session.

7. The method of claim 1, wherein the second transaction type includes transactions that are not executable in the local session.

8. The method of claim 1, wherein the second transaction type includes transactions that require an ephemeral node for their execution.

9. The method of claim 1, wherein the first type transaction that executes in the local session includes a transaction selected from a group consisting of (a) a connection request by the client device to a server in the group, (b) a read request from the client device, (c) a watch request, by the client device, on a node in the server the client device is connected to, and (d) a write request, by the client device, to the server the client device is connected to.

10. The method of claim 1, wherein each server in the group of servers is aware of transactions executed in the global session between the server and the client device.

11. The method of claim 1, wherein the client device connects to only one server in the group of servers.

12. The method of claim 1, wherein each server in the group of servers is aware of a state of other servers in the group.

13. An apparatus comprising:
a processor;
one or more storage devices storing processor executable instructions which, when executed by the processor, perform a method of:
receiving, at a server in a group of servers and from a client device, a request for executing a transaction by the server;
determining, at the server, a type of the transaction as a first transaction type or a second transaction type;
responsive to a determination that the transaction is of the first transaction type, creating or using, by the server, an existing local session between the server and the client device for executing the transaction, wherein the transaction of the first transaction type does not require the local session to be kept track of by at least a majority of the servers in the group;
responsive to a determination that the transaction is of the second transaction type, converting, by the server, the existing local session to a global session between the client device and the server, wherein:
the existing local session is associated with a prior transaction that is of the first transaction type and is separate from the transaction, and
the transaction of the second transaction type requires the global session to be kept track of by at least a majority of the servers in the group for executing in the group, wherein converting the existing local session includes:
informing the servers in the group about the existing local session,
requesting, by the server, a leader server in the group to obtain a vote of the majority of the servers in the group to create an ephemeral node at the server using the global session, the ephemeral node representing the transaction of the second transaction type,
forwarding, by the leader server to the server, the vote to create the ephemeral node, and
creating, at the server and by the client device in response to receiving the vote, the ephemeral node, wherein the ephemeral node contains data required for the execution of the transaction of the second transaction type, and wherein the ephemeral node is stored in each server of the group of servers for a lifetime of the global session between the server and the client device; and
executing, at the server, the transaction in the group, wherein the executing includes:
using the ephemeral node for discovering, based on metadata published by multiple services, a location of one or more of the multiple services executing in a distributed computing system.

14. The apparatus of claim 13, wherein the processor executable instructions which, when executed by the processor, performs the method further comprising:
synchronizing a state of the ephemeral node across each server of the group of servers.

15. An article of manufacture comprising:
a non-transitory computer-readable medium containing machine executable instructions which, when executed by a machine, performs a method of:
receiving, at a server in a group of servers and from a client device, a request for executing a transaction by the server;
determining, at the server, a type of the transaction as a first transaction type or a second transaction type;
responsive to a determination that the transaction is of the first transaction type, creating or using, by the server, an existing local session between the server and the client device for executing the transaction, wherein the transaction of the first transaction type does not require the local session to be kept track of by at least a majority of the servers in the group;
responsive to a determination that the transaction is of the second transaction type, converting, by the server, the existing local session to a global session between the client device and the server, wherein:
the existing local session is associated with a prior transaction that is of the first transaction type and is separate from the transaction, and
the transaction of the second transaction type requires the global session to be kept track of by at least a majority of the servers in the group for executing in the group, wherein converting the existing local session includes:

informing the servers in the group about the existing local session, requesting, by the server, a leader server in the group to obtain a vote of the majority of the servers in the group to create an ephemeral node at the server using the global session, the ephemeral node representing the transaction of the second transaction type, forwarding, by the leader server to the server, the vote to create the ephemeral node, and creating, at the server and by the client device in response to receiving the vote, the ephemeral node, wherein the ephemeral node contains data required for the execution of the transaction of the second transaction type, and wherein the ephemeral node is stored in each server of the group of servers for a lifetime of the global session between the server and the client device; and executing, at the server, the transaction in the group, wherein the executing includes:

using the ephemeral node for discovering, based on metadata published by multiple services, a location of one or more of the multiple services executing in a distributed computing system.

16. A method comprising:

receiving, at a server in a group of servers and from a client device, a request for executing a transaction in the group;

determining, at the server, whether the transaction is for creating an ephemeral node; and responsive to a determination that the transaction is for creating an ephemeral node, converting, by the server, an existing local session between the client device and the server to a global session by:

informing the servers in the group about the existing local session between the client device and the server, wherein the existing local session is associated with a prior transaction that is of the first transaction type and is separate from the transaction, requesting, by the server, a leader server in the group to obtain a vote of the majority of the servers in the group to create an ephemeral node at the server using the global session, forwarding, by the leader server to the server, the vote to create the ephemeral node, and creating, at the server and by the client device in response to receiving the vote, the ephemeral node representing the transaction, wherein the global session is associated with the ephemeral node at each of the servers in the group, and wherein the ephemeral node is stored in each server of the group of servers for a lifetime of the global session between the server and the client device, wherein the creating further includes: using the ephemeral node for discovering, based on metadata published by multiple services, a location of one or more of the multiple services executing in a distributed computing system.

* * * * *